UNITED STATES PATENT OFFICE.

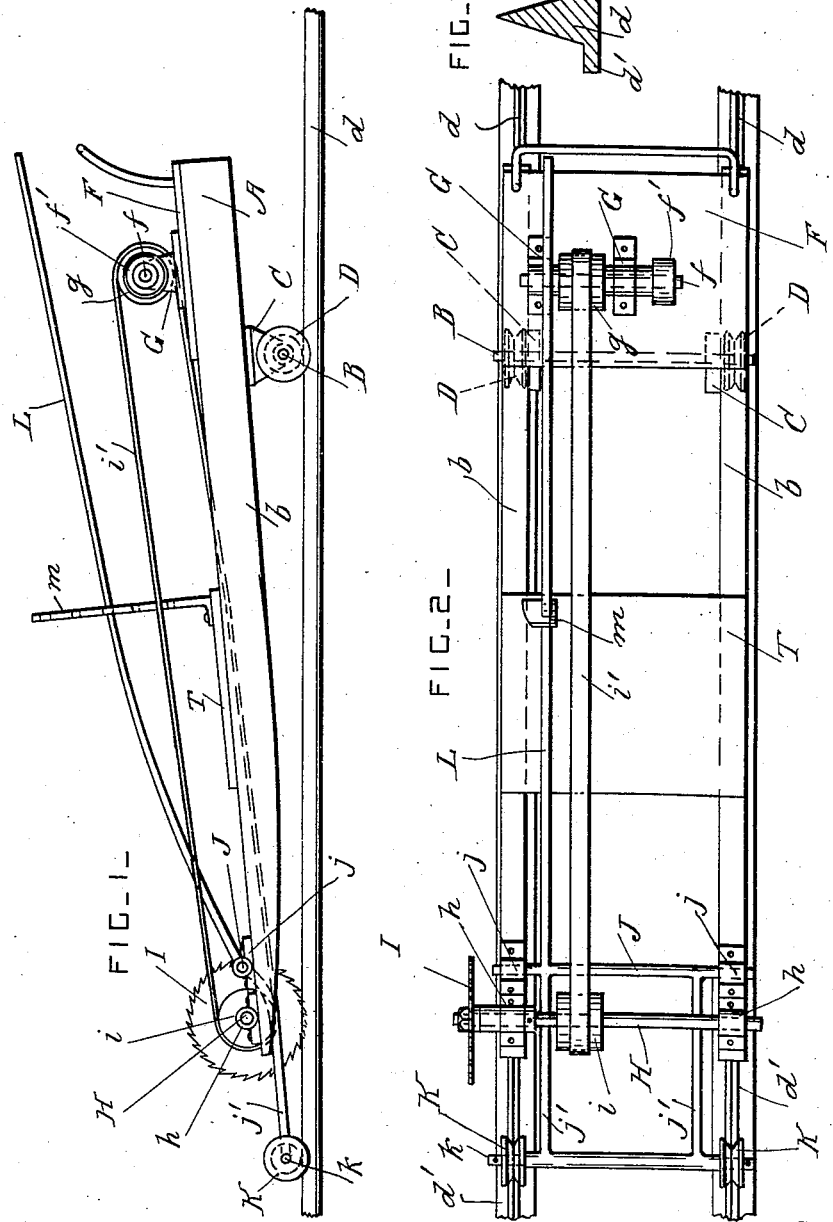

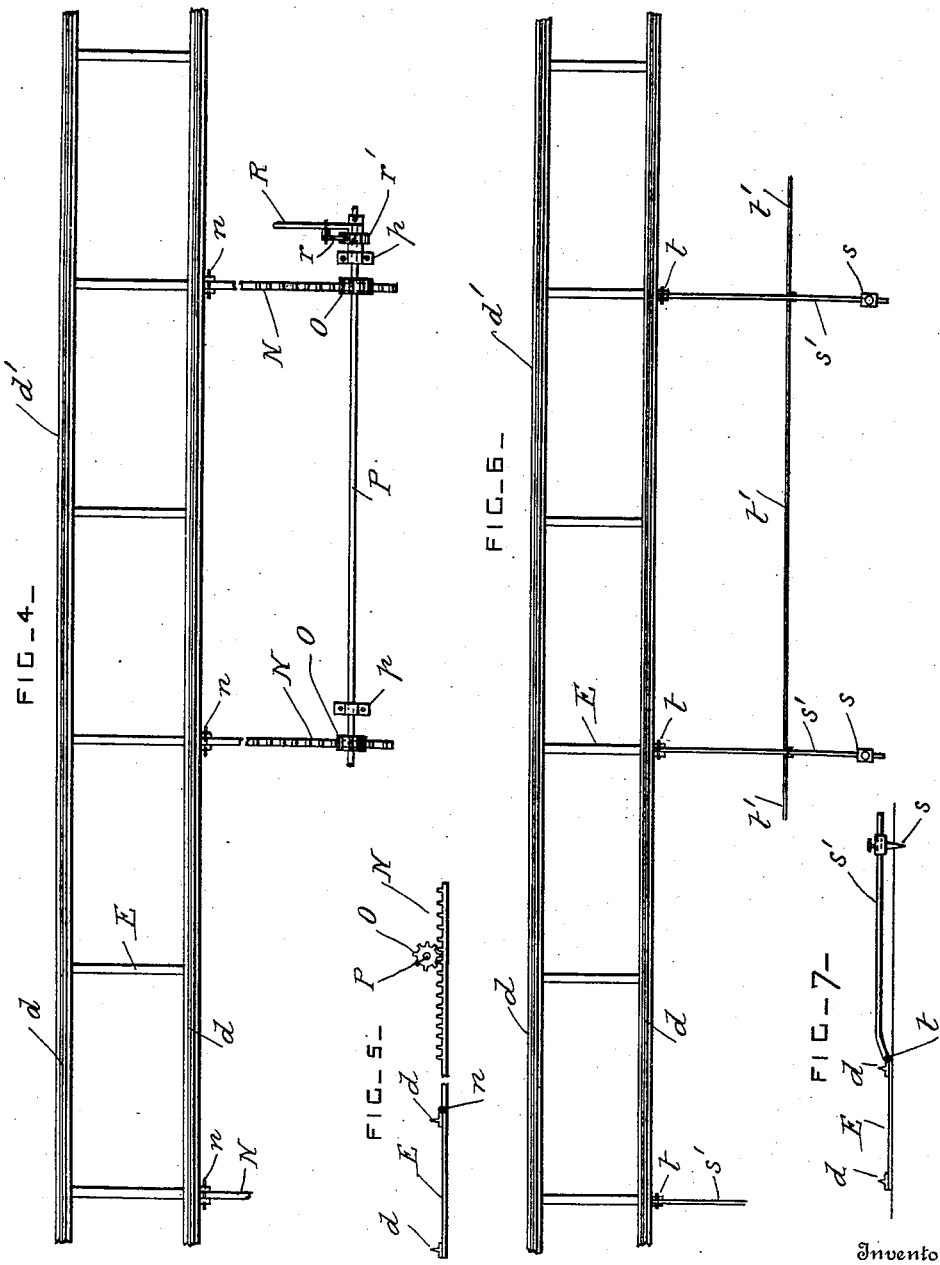

CHRISTIAN KELLER AND HERMAN SCHWARK, OF COCHRANE, WISCONSIN.

MACHINE FOR CUTTING ICE.

968,243.

Specification of Letters Patent. Patented Aug. 23, 1910.

Application filed March 2, 1910. Serial No. 546,900.

*To all whom it may concern:*

Be it known that we, CHRISTIAN KELLER and HERMAN SCHWARK, citizens of the United States, residing at Cochrane, in the county of Buffalo and State of Wisconsin, have invented certain new and useful Improvements in Machines for Cutting Ice; and we do hereby declare the following to be a full, clear, and exact description of the invention, such as will enable others skilled in the art to which it appertains to make and use the same.

This invention relates to machines for cutting ice into blocks; and it consists in the novel construction and combination of the parts hereinafter fully described and claimed.

In the drawings, Figure 1 is a side view of the machine. Fig. 2 is a plan view of the machine. Fig. 3 is a cross-section through one of the track rails, drawn to a larger scale. Fig. 4 is a plan view of the track, drawn to a smaller scale. Fig. 5 is an end view of the track shown in Fig. 4. Fig. 6 is a plan view of a track for a small machine. Fig. 7 is an end view of the track shown in Fig. 6.

A is the frame of the machine provided with side-bars $b$ which are tapered in depth.

B is the main axle of the machine journaled in bearings C secured to the deeper end portions of the side-bars $b$ near one end of the frame.

D are grooved wheels secured on the axle B, and adapted to run on track rails $d$. The track rails are shaped like an inverted letter V in cross-section and have flanges $d'$ at their bases or broad ends.

E are tie-bars which prevent the rails from spreading. This form of rail prevents ice dust from accumulating on the rails, and prevents the wheels from leaving the rails.

F is a platform at one end of the frame A over the main axle. Any suitable motor, such as a gas engine, is mounted on this platform, and is arranged to drive a shaft $f$ by means of a pulley $f'$ or other suitable driving device secured on the shaft.

The shaft $f$ is journaled in bearings G secured to the platform, and a driving pulley $g$ is secured on the shaft.

H is the saw shaft which is journaled in bearings $h$ secured to the other end portion of the frame from the platform F. A driving pulley $i$ is secured on the saw shaft, and $i'$ is a driving-belt which passes around the pulleys $g$ and $i$.

Other suitable driving devices, such as sprocket-wheels and a drive-chain, can be used in place of the pulleys and belt, if desired.

I is a circular saw which is secured on one end portion of the shaft H, outside the frame A.

J is a rock-shaft which is mounted in bearings $j$ secured to the frame A adjacent to the saw shaft, and $j'$ are arms which are secured to the rock-shaft J and which project under the saw shaft.

K are grooved wheels which are mounted on the end portions of an axle $k$ which is carried by the free end portions of the arms $j'$. The grooved wheels K run upon the track rails and support the other end portion of the frame which is not supported by the main wheels D.

L is a long lever secured to the rock-shaft J and extending to the platform F. A catch $m$ is secured to the frame A for the lever L to engage with. The lever is sprung into engagement with the various steps or notches of the catch so as to hold the saw I at different levels.

The frame is drawn or pushed along the track rails by any approved means, and if desired the main axle may be driven by the engine on the platform by any desired driving mechanism.

The saw is revolved rapidly and cuts the ice as the machine is moved along the track rails. The saw is raised out of the ice at the end of each cut by the operator stepping backward on the platform and raising the free end of the lever L. The machine is then placed in a suitable position to make another cut.

T is a platform at the middle part of the frame A. Weights can be placed on this platform, if desired, to adjust the balance of the machine and make it work to the best advantage.

The track shown in Figs. 4 and 5 is provided with a series of toothed racks N which are pivoted to one of the track rails by pins $n$. O are toothed wheels secured upon a shaft P which is journaled in stationary bearings $p$. These bearings are secured to the ice by spikes, or in any other approved manner. The wheels O gear into the racks N, and the shaft P is provided at one end with an operating lever R. The lever R is mounted loose on the shaft, and it carries a pawl $r$ which engages with a ratchet-wheel $r'$ which is secured on the shaft P. The track rails are moved laterally so as to place them in a position for the saw to make another cut parallel to the first cut by oscillating the lever R by hand.

In Figs. 6 and 7 a track for a small machine is shown, which is moved laterally by hand. This track is provided with adjustable gages $s$ which are secured adjustably on rods $s'$ which are pivoted to one of the track rails by pins $t$ and connected together by suitable braces $t'$. The gages are dropped into engagement with the groove or cut in the ice so as to insure the second cut being parallel with the first cut. The track shown in Figs. 4 and 5 can be provided with these gages, if desired, but as it is moved bodily by the racks and toothed wheels, the gages are not usually necessary.

What we claim is:

1. In an ice cutting machine, the combination, with a tilting frame mounted on a main axle and wheels, of a driving shaft, a saw shaft provided with a saw, said shafts being journaled at the opposite ends of the frame, driving connections between the said shafts, a lever pivoted to the said frame adjacent to the saw shaft and provided with a handle portion which extends to the vicinity of the driving shaft, and wheels operatively connected with the said lever and affording a means for tilting the frame on its main axle to raise and lower the saw.

2. In an ice cutting machine, the combination, with a frame having a platform for the operator at one end portion, of a main axle and wheels arranged under the said platform, a driving shaft supported over the said platform, a saw shaft provided with a saw and journaled at the other end portion of the frame, driving connections between the said driving shaft and saw shaft, a rock-shaft pivoted to the frame adjacent to the saw shaft, arms secured to the rock-shaft, wheels carried by the said arms, and a lever secured to the rock-shaft and extending to the said platform and affording a means for raising and lowering the saw.

3. In an ice cutting machine, the combination, with guides adapted to be secured on the ice and having inclined sides, of a frame provided with a main axle at one end portion, a driving shaft journaled at the same end of the frame as the main axle, a saw shaft provided with a saw and journaled at the other end of the frame, driving connections between the said shafts, a lever pivoted to the said frame adjacent to the saw shaft and provided with a handle portion which extends to the vicinity of the driving shaft, and wheels provided with V-shaped grooves, said wheels being operatively connected with the said lever and axle and running on the said guides and preventing the frame and saw from moving sidewise.

4. In an ice cutting machine, the combination, with a track provided with rails, of a series of toothed rack-bars secured to one of the rails, a shaft arranged parallel to the rails, stationary bearings for supporting the said shaft, toothed wheels secured on the said shaft and gearing into the said racks, an operating lever provided with a ratchet-wheel and pawl and operating to revolve the said shaft step by step, a wheeled frame mounted to run on the said track, and driving devices provided with a circular saw and carried by the said frame.

In testimony whereof we affix our signatures, in presence of two witnesses.

CHRISTIAN KELLER.
HERMAN SCHWARK.

Witnesses:
JOHN MEILI,
JULIUS L. STIEN.